Feb. 27, 1951   G. V. WOODLING   2,543,087
TURNABLE COUPLING MEMBER
Filed Nov. 22, 1947

INVENTOR.
George V. Woodling
BY.

Patented Feb. 27, 1951

2,543,087

UNITED STATES PATENT OFFICE 2,543,087

TURNABLE COUPLING MEMBER

George V. Woodling, Cleveland, Ohio

Application November 22, 1947, Serial No. 787,566

1 Claim. (Cl. 285—86)

My invention relates in general to a tube coupling member and more particularly to a tube coupling member adapted to be turnably and sealingly connected to a tube inserted therein. This invention constitutes an improvement over the invention shown in my copending applications for Letters Patent Serial Numbers 574,467 and 574,468, filed January 25, 1945, now Patent Numbers 2,438,529 and 2,538,530.

An object of my invention is the provision of making a turntable connection between a tube and a coupling member whereby the coupling member may be threadably connected to a threaded element without twisting the tube.

Another object of my invention is the provision of a coupling member disposed to be turnably and sealingly connected to a tube inserted therein, in which the sealing means is fixedly bonded to the coupling member and is turnably engageable with the tube to effect a sealing engagement therewith.

Another object of my invention is the provision of a coupling member having a fixed annular wall of predetermined longitudinal extent to receive sealing means comprising an annular body of resilient material having outer and inner surface areas, the outer surface area being mountable in sealing engagement with the fixed annular wall prior to the insertion of the tube in the coupling member, and the inner surface area being sealingly engageable with the inserted tube for a longitudinal distance less than the longitudinal extent of the fixed annular wall against which the outer surface area engages to effect a turntable sealing engagement between the tube and the inner surface area.

Another object of my invention is the provision of a coupling member having a fixed annular wall of predetermined longitudinal extent to receive sealing means comprising a hollow sleeve of resilient material, the sleeve having a portion of its length fixedly bonded to the fixed annular wall and having its remaining unbonded portion turnably engageable with the tube to effect a turnable sealing engagement therewith.

Another object of my invention is the provision of a coupling member having sealing means fixedly bonded therein in which the sealing means is turnably engageable by an expanded section of the tube whereby the sealing means resists the longitudinal pull of the tube from the coupling member.

Figure 1:
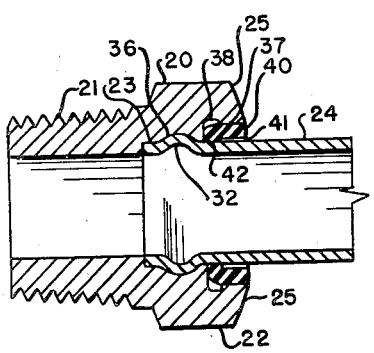
Figure 2:
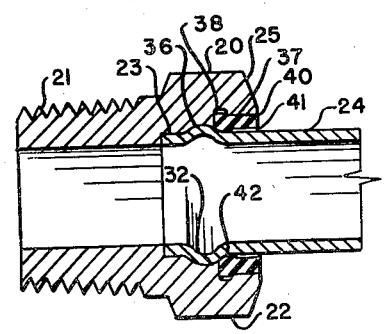

Other objects and a fuller understanding of my invention may be had by referring to the following description and claim, taken in conjunction with the accompanying drawing in which:

Figure 1 is a longitudinal cross-sectional view of my assembled coupling, and shows the sealing means which comprises a hollow sleeve having a portion of its length fixedly bonded to the counterbore of the coupling member, and having its remaining unbonded portion turnably engageable with the tube to effect a turnable sealing engagement therewith; and Figure 2 is a view of Figure 1, but shows the expanded section of the tube being turnably engageable against the sealing means.

With reference to Figure 1 of the coupling drawing, my invention is shown as being applied to a coupling member 20 which is adapted to be connected to a tube 24. The left-hand end portion of the coupling member 20 is provided with threads 21, which are usually in the form of pipe threads, for engaging a cylinder, valve or other threadable element. The right-hand end of the coupling member 20 comprises a nut portion 22 whereby the coupling member may be turned by a suitable wrench or tool. The coupling member is provided with a counterbore 23 into which the end portion of the tube 24 is inserted. The tube may be of any suitable material, and is further characterized as being outwardly extensible whereby a section thereof may be expanded into the coupling member after insertion therein to make an internal expansion fit with the coupling member 20.

Instead of being provided with male threads 21, the coupling member 20 may be provided with female threads for connection to a fitting element, as shown in my copending application Serial No. 574,467, filed January 25, 1945, now Patent Number 2,438,529. The right-hand end of the coupling member is provided with an end surface 25, and the counterbore 23 extends longitudinally inwardly of the coupling member from the end surface 25. The counterbore 23 comprises a first portion 36 to receive an expanded section 32 of the tube, and a second portion 37 to receive sealing means 40 which comprises a hollow sleeve of resilient material of rubber-like nature. The first portion 36 of the counterbore has an arcuate surface against which the expanded section 32 of the tube turnably engages, which provides for relative turning movement between the coupling member and the tube. The expanded section 32 of the tube may be expanded laterally outwardly by any suitable means, and in its expanded position it makes a relatively close engagement with the arcuate surface of the first portion 36 of the counterbore to produce a turnable expansion fit which provides for relative turning movement between the coupling member 20 and the tube 24, so that the coupling member may be threadably connected to a threaded element without twisting the tube.

The second portion 37 of the counterbore as shown in Figure 1 is substantially cylindrical, and the outer surface of the sealing sleeve 30 is fixedly bonded thereto. The bonding of the sealing sleeve to the cylindrical surface of the second portion 37 is effected by well-known processes, such as the "Cycleweld" process developed by the Chrysler Corporation or the "Pliobond" process developed by the Goodyear Tire and Rubber Company, or by any other established process. The bonding produces a strong and vibration resistant welded connection, and the sealing sleeve 40 is thus able to resist longitudinal pull from the coupling member.

The first portion of the counterbore is in the form of an internal groove 36 to receive the expanded section 32 of the tube, which provides for relative turning movement between the coupling member and the tube. The turnable engagement between the expanded section of the tube and the groove 36 resists longitudinal pull of the tube from the coupling member. The second portion of the counterbore which is identified by the reference character 37 terminates at its left-hand end into a relief section 38 which has a larger diameter than the entrance cylindrical wall of the counterbore. The outer surface area of the sealing sleeve 40 is fixedly bonded to the cylindrical wall, but is not fixedly bonded to the relief section 38, with the result that the forward or left-hand end of the sealing sleeve 40 remains unbonded and is turnably engageable with the tube to effect a turnable sealing engagement therewith. In Figure 1, the inner surface of the sealing sleeve which engages the tube is identified by the reference character 42, with the result that the surface area of the sealing sleeve 40 which engages the tube at 42 has a longitudinal extent less than the longitudinal length of the sealing sleeve, whereby the engagement between the sealing sleeve and the tube does not interfere or prevent turnable engagement between the expanded section of the tube and the groove 36. The unbonded portion at the left-hand end of the sealing sleeve 40 may be easily stretched to receive the tube. As shown in Figure 1, there is a clearance 41 between the inside surface area of the sealing sleeve 40 and the tube, the clearance extending from the right-hand or rearward end of the sealing sleeve up to the inner surface sealing area 42 of the unbonded portion which engages the tube. By reason of the presence of the clearance and by reason of the fact that the unbonded portion may be readily expanded, the tube may be easily inserted within the coupling member prior to the expanding of the tube within the groove 36.

The embodiment of the invention shown in Figure 2 is in line with the invention shown in Figure 1, except that the right-hand or rearward side of the expanded section of the tube 32 turnably engages the forward or left-hand end of the sealing sleeve 40, with the result that the sealing sleeve 40 resists longitudinal pull of the tube from the coupling member.

Although my invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A tube coupling member disposed to be turnably and sealingly connected to a tube inserted therein, said coupling member having a counterbore extending longitudinally inwardly from an end thereof, and sealing means comprising a hollow sleeve of resilient material positioned in said counterbore and having a portion of its length fixedly bonded to a portion of the counterbore and having its remaining unbonded portion turnably engageable with the tube to effect a turnable sealing engagement therewith.

GEORGE V. WOODLING.

REFERENCES CITED

The following references are of record in the file of this patent:

UNITED STATES PATENTS

| Number | Name | Date |
|---|---|---|
| 1,153,002 | Wright | Sept. 7, 1915 |
| 1,817,774 | Sipe | Aug. 5, 1931 |
| 2,274,234 | Ekkebus et al. | Feb. 24, 1942 |
| 2,396,078 | Box | Mar. 5, 1946 |
| 2,423,122 | Stephens | July 1, 1947 |
| 2,438,530 | Woodling | Mar. 30, 1948 |